US006424622B1

(12) United States Patent
Fan et al.

(10) Patent No.: US 6,424,622 B1
(45) Date of Patent: Jul. 23, 2002

(54) OPTIMAL BUFFER MANAGEMENT SCHEME WITH DYNAMIC QUEUE LENGTH THRESHOLDS FOR ATM SWITCHES

(75) Inventors: Ruixue Fan, Cranbury; Alexander Ishii, Princeton, both of NJ (US); Brian Mark, Paris (FR); Gopalakrishnan Ramamurthy, Cranbury; Qiang Ren, Somerset, both of NJ (US)

(73) Assignee: NEC USA, Inc., Princeton, NJ (US)

( * ) Notice: Subject to any disclaimer, the term of this patent is extended or adjusted under 35 U.S.C. 154(b) by 0 days.

(21) Appl. No.: 09/249,324

(22) Filed: Feb. 12, 1999

(51) Int. Cl.[7] ................................. H04L 12/26
(52) U.S. Cl. .................. 370/230; 370/395.41
(58) Field of Search ...................... 370/229, 230, 370/230.1, 231, 395.1, 395.4, 395.41, 395.42, 395.43, 412, 413, 415, 417, 428, 429, 465

(56) References Cited

U.S. PATENT DOCUMENTS 5,864,538 A * 1/1999 Chong et al. .............. 370/235
6,052,361 A * 4/2000 Ansari et al. .............. 370/232
6,118,764 A * 9/2000 Depelteau et al. ......... 370/235

OTHER PUBLICATIONS

A. K. Choudhury et al., "Dynamic Queue Length Thresholds for Shared–Memory Packet Switches," IEEE/ACM Transactions on Networking, vol. 6, No. 2, Apr. 1998, pp. 130–140.
M. Irland, "Buffer Management in a Packet Switch," IEEE Transactions on Communications, vol. Com–26, No. 3, Mar. 1978, pp. 328–337.
F. Kamoun, "A Drop and Throttle Flow Control Policy for Computer Networks," IEEE Transactions on Communications, vol. Com–29, No. 4, Apr. 1981, pp. 444–452.
F. Kamoun et al., "Analysis of Shared Finite Storage in a Computer Network Node Environment Under General Traffic Conditions," IEEE Transactions on Communications, vol. Com–28, No. 7, Jul. 1980, pp. 992–1003.
E. Zegura, "Architectures for ATM Switching Systems," IEEE Communication Magazine, Feb. 1993, pp. 28–37.

* cited by examiner

Primary Examiner—Kwang Bin Yao
(74) Attorney, Agent, or Firm—Sughrue Mion, PLLC (57) ABSTRACT

A buffer management scheme for an ATM switch where the static and dynamic thresholds are applied appropriately at different levels to ensure efficient and fair usage of buffer memory. A novel dynamic threshold mechanism which, while ensuring fair sharing of memory, maximizes the overall memory utilization. An ATM switch using a dynamic queue threshold scheme, said ATM switch comprising K output port queues and a buffer of B cells sharing said K output port queues, wherein a common threshold is dynamically set for the K output port queues, the common threshold being changed to a new value from an old value when a new cell arrives at any of said K output queues, said new value being a maximum of a length of said any of said K output queues plus one and said old value when total queue length is less than a preset value times B and, said new value being a maximum of a said old value minus one and a statically set minimum buffer threshold when total queue length is greater than or equal to a preset value times B, wherein said preset value is greater than or equal to 0.

9 Claims, 4 Drawing Sheets

OPTIMAL BUFFER MANAGEMENT SCHEME WITH DYNAMIC QUEUE LENGTH THRESHOLDS FOR ATM SWITCHES

FIELD OF THE INVENTION

The present invention relates to a buffer management scheme for ATM switches. Specifically, the present invention provides an optimal buffer management scheme for ATM switches using dynamic queue lengths. The present invention is embodied in an ATM switch that uses a dynamic queue threshold and a method of dynamically setting a common threshold for queues in an ATM switch.

BACKGROUND

Conventionally, ATM switch architectures used buffering to accommodate cells whose service has been delayed due to contention for bandwidth or temporary congestion within the switch. Literature. See E. W. Zegura, "Architectures for ATM Switching Systems", IEEE Communications Magazine, pp. 28–37, February, 1993. Among these architectures, the shared buffer memory switches are preferred because of they utilize buffers more efficiently. By sharing the buffer, e.g., among all output ports, and taking advantage of the statistical multiplexing on input traffic, shared buffer ATM switches are able to achieve the same cell delay and loss performance with a smaller buffer size per port. Such a buffer size reduction effect is even more significant when the traffic is bursty and traffic load is uneven.

In an ATM switch, the buffer memory is usually shared at several different levels. For example, the buffer can be logically partitioned and shared by different service classes, i.e., CBR, VBR, ABR, UBR, etc. As mentioned above, the buffer can be shared among queues corresponding to different output ports. If per-VC queuing is adopted, the buffer can be shared among queues corresponding to different VCs.

However, the shared-memory switches without buffer management procedures do not perform well under overload conditions. See M. I. Irland, "Buffer management in a packet switch," IEEE Trans. Commun., vol. COM-26, pp. 328–337, March 1978. A key problem is fairness among the various output ports. The statistical sharing of the buffer memory introduces the possibility that a small group of output ports consume most of the memory. Such an excessive use memory by some ports prevent cells destined for less utilized ports from gaining their fair share of memory. In a worst case scenario even access is prevented.

One conventional solution to such problem is setting restrictions on the amount of buffering a port can use. That is, each queue has a threshold of the maximum amount of memory it can access as well as a minimum amount guaranteed for itself.

Different threshold-setting methods have been proposed and analyzed in literature. See F. Kamoun and L. Kleinrock, "Analysis of Shared Finite Storage in a Computer Network Node Environment Under General Traffic Conditions", IEEE Trans. Commun., Vol.Com-28, No. 7, pp. 992–1003, July, 1980. There are generally two techniques of setting queue thresholds.

One technique is called static threshold (ST). In this method, buffer thresholds are pre-set for each queue, by the network management system (NMS). An arriving cell is accepted only if the corresponding queue length is less than the given threshold value. The ST method is simple to implement and only requires the corresponding queue counters and a comparator. In choosing the static thresholds for different queues, the NMS is required to know the characteristics and the statistics of the traffic. The traffic arriving at the queues are required to be in line with their descriptions. Therefore, the ST method is more appropriate for traffic at class level, i.e., CBR, VBR and UBR, in which the traffic is more predictable for the whole class although they may fluctuate substantially with respect to different port queues and individual connections within the class.

Another technique is called dynamic threshold (DT). In this method, buffer thresholds are dynamically adjusted according to the changing traffic load. The DT technique allows the overloading traffic to get access to memory as long as its queue has not exceeded its fair share of the memory, i.e., the dynamic threshold. Therefore, a good dynamic threshold method should improve the overall switch bandwidth utilization while ensuring fair sharing of buffer memory among different queues. In general, DT schemes require more processing power and are more appropriate for buffer management at port or VC level. In these levels traffic load variation may fluctuate substantially (although mostly lasting in a shorter time span) among different queues. The relative short time scale with respect to the traffic load variation at port and VC level requires any DT scheme to be simple for implementation practice.

For the above two schemes, performances in various traffic conditions have been compared through a comprehensive simulation study. See Choudhury and Hahne in A. K. Choudhury and E. L. Hahne, "Dynamic Queue Length Thresholds in a Shared-Memory Packet Switch", IEEE/ACM Trans. Networking, Vol. 6, No., pp. 130–140, April, 1998. In particular, they have proposed a simple and elegant DT scheme that ensures the fair sharing of buffer memory with a certain amount of buffer being unallocated. However, in this scheme the buffer memory utilization is low when only a small number of queues are overloaded.

SUMMARY OF THE PRESENT INVENTION

In order to overcome the problems in conventional methods it is an object of the present invention to provide an ATM switch that uses a dynamic queue threshold scheme that enables efficient utilization of available memory regardless of the numbers of overloaded queues.

Another objective of the present invention is to provide a hierarchical buffer management scheme using ST and DT algorithms. A further object is to provide a new dynamic queue threshold algorithm, which improves buffer utilization. In order to accomplish the objects of the present invention there is provided An ATM switch using a dynamic queue threshold scheme, said ATM switch comprising K output port queues and a buffer of B cells sharing said K output port queues, wherein a common threshold is dynamically set for the K output port queues, the common threshold being changed to a new value from an old value when a new cell arrives at any of said K output queues, said new value being a maximum of a length of said any of said K output queues plus one and said old value when total queue length is less than a preset value times B and, said new value being a maximum of a said old value minus one and a statically set minimum buffer threshold when total queue length is greater than or equal to a preset value times B, wherein said preset value is greater than 0.

Preferably the length of each of said K output queues fluctuates based on variations in an incoming traffic load and a service bandwidth allocated to said each of said K output queues.

Preferably, a new cell is accepted to a specific queue when a length of said specific queue is less than the new value and total queue length is less than B.

Preferably, the statically set minimum buffer threshold is equal to zero by default. Preferably, a small amount of buffer B is allocated for some predetermined operations.

Preferably, buffer memory is allocated to VCs within said each of said K output queues, further using the dynamic queue threshold scheme.

Preferably, the dynamic queue threshold scheme is applied to multiple levels of dynamic buffers.

Another aspect of the present invention is a method of dynamically setting a common threshold T(t) for K queues in an ATM switch comprising said K queues, a buffer of B cells shared by said K queues, each of said K queues having a queue length of $Q_k(t)$ at time t and k=1,2 . . . K, with $Q_k(t)$ fluctuating with incoming traffic load and service bandwidth allocated to output port k, said method comprising:

setting a dynamic threshold T(t) wherein $T_{new}(t)=\max(Q_k(t)+1, T_{old})$ when $Q(t)<\alpha*B$;

$T_{new}(t)=\max(T_{old}-1, T_m)$ when $Q(t)>=\alpha*B$;

wherein Q(t) is a total queue length at time t and $0<\alpha<=1$, and $T_m$ is a minimum buffer threshold statically set, updating $T_{new}(t)$ and accepting a new arriving cell at output port k at time t if $Q_k(t)<T_{new}(t)$ and $Q(t)<B$, otherwise blocking said new arriving cell. Yet another aspect of the present invention is a method of dynamically setting a common threshold T(t) for K queues in an ATM switch comprising said K queues, a buffer of B cells shared by said K queues, each of said K queues having a queue length of $Q_k(t)$ at time t and k=1,2 . . . K, and l=1, 2, . . . $L_k$ with $Q_k(t)$ fluctuating with incoming traffic load and service bandwidth allocated to output port k, each queue comprising $L_k$ VCs and each VC queue of port K has a queue of length $Q_{kl}(t)$ said method comprising:

setting a dynamic threshold TP(t) for each output queue wherein $TP_{new}(t)=\max(Q_k(t)+1, TP_{old})$ when $Q(t)<\alpha*B$;

$TP_{new}(t)=\max(TP_{old}-1, T_m)$ when $Q(t)>=\alpha*B$;

setting a dynamic threshold $TV_k(t)$ for each VC assigned to queue k wherein $TV_k^{new}(t)=\max(Q_{kl}(t)+1, TV_k^{old})$ when $Q(t)<\beta*TP(t)$;

$TV_k^{new}(t)=\max(TV_k^{old}-1, T_m)$ when $Q(t)>=\beta*TP(t)$;

wherein $Q_k(t)$ is a total queue length for kth queue at time t and $0<\alpha<=1$, $0<\beta<=1$ and $T_m$ is a minimum buffer threshold statically set, updating TP(t) and $TV_k$(t) and accepting a new arriving cell at output port k at time t if $Q_k(t)<TP(t)$ and $Q_{kl}(t)<TV_k(t)$ and $Q(t)<B$, otherwise blocking said new arriving cell.

LIST OF FIGURES

The above objectives and advantages of the present invention will become more apparent by describing in detail preferred embodiments thereof with reference to the attached drawings in which.

DETAILED DESCRIPTION OF THE PRESENT INVENTION

Buffer Management in ATM Switches

Figure 1:
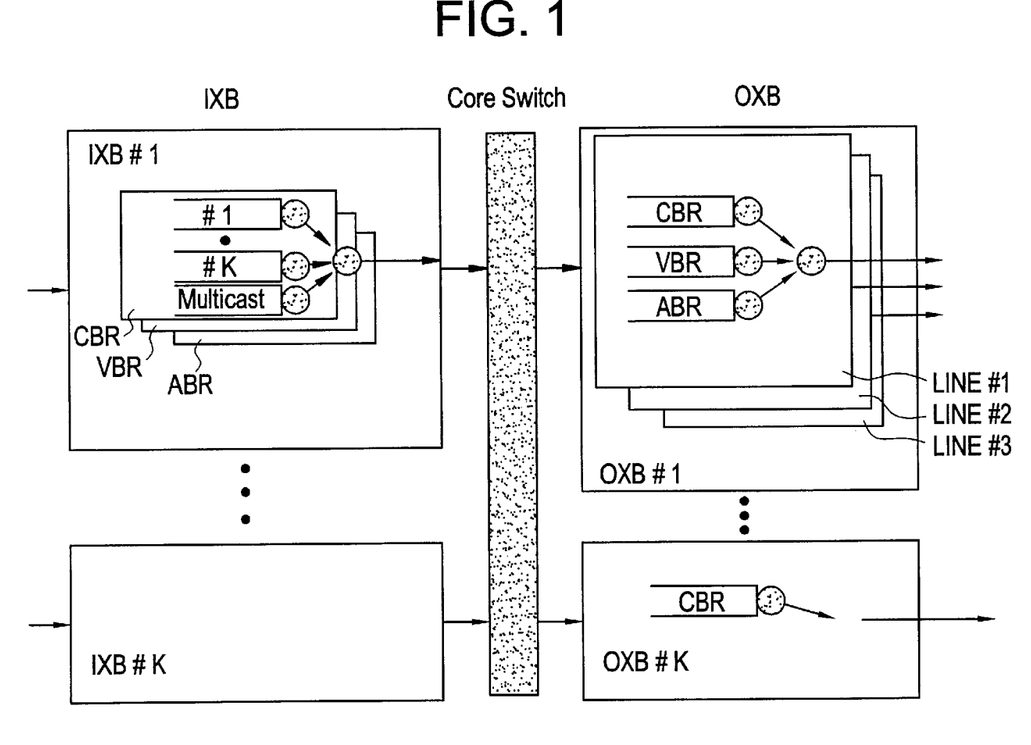
FIG. 1 shows an ATM switch with input and output queuing modules.
Figure 2:
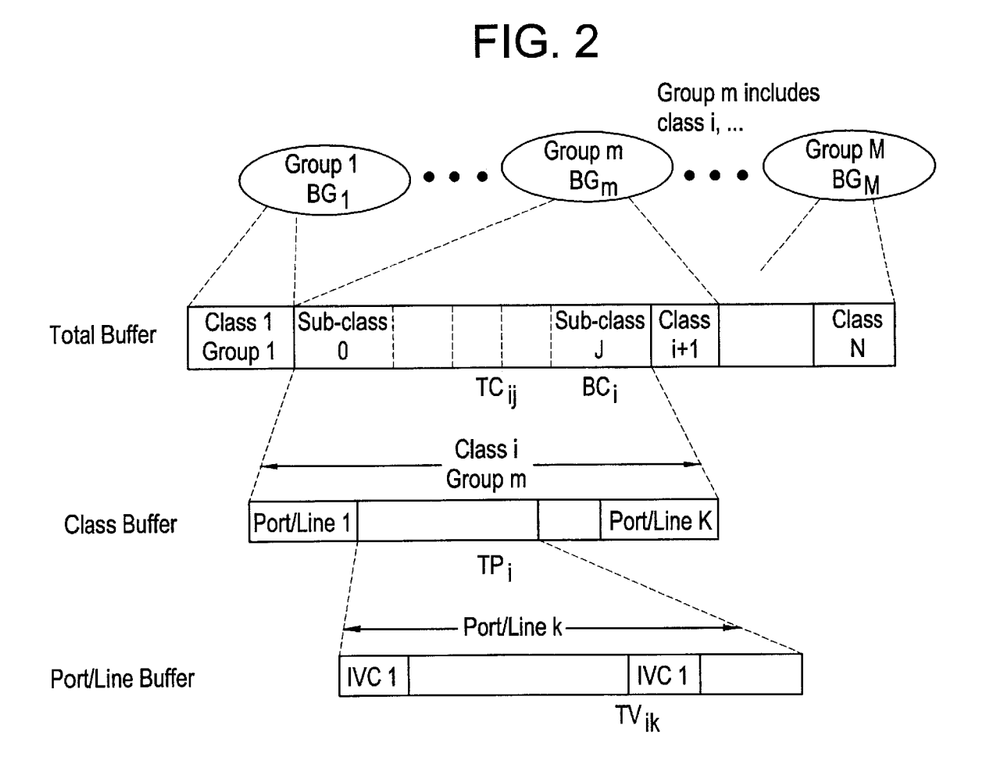
FIG. 2 shows a hierarchical buffer memory allocation scheme at different levels: group, class, sub-class, port/line, VC.

In ATM switches, buffer memory is divided and shared in several different ways: among queues belonged to different traffic classes; among queues destined to different output ports; among queues of different VCs if per-VC queuing is adopted, etc. In FIG. 1 an architectural layout of an ATM switch with input and output queuing is shown. In this embodiment the switch has K input modules and K output modules with similar structure and functionalities. At each input module, the buffer memory is shared and logically divided in a hierarchical way as shown in FIG. 2.

The total buffer memory at an input module is B cells, and there are N traffic classes. The N traffic classes consist of CBR, VBR (real-time and non real-time), ABR and UBR, etc. Each traffic class belongs to one of M groups, M<N. Each group contains traffic classes of similar statistical characteristics, e.g., all non real-time VBR classes may belong to one group. The total buffer B is partitioned and dedicated to each group. Group m, m=1, 2, . . . , M, is allocated a dedicated $BG_m$ memory and $$\sum_{m=1}^{M} BG_m \leq B$$

There is no sharing of memory between groups and $BG_m$ are static group buffer thresholds chosen and tuned by network management system. The traffic classes assigned to group m can share the group memory $BG_m$ in such a way that the maximum number of buffer class i (where class i is assigned to group m) can use is also limited by $BC_i, i = 1, 2, \ldots, N$, and $$\sum_{i \in m} BC_i \geq BG_m, \text{ and } BC_i \leq BG_m$$

This ensures that while maximizing the buffer utilization by complete sharing within a group, there is no excessive consuming of buffer memory by any one class in a group. For each traffic class i of buffer allocation $BC_i$, J sub-classes for cells with different loss or delay priorities may be present. The buffer threshold for sub-class j is set to be $TC_{ij}$, J=1, 2, . . . , J. The choice of $TC_{ij}$ is made by applying certain queuing models. See F. Kamoun and L. Kleinrock, "Analysis of Shared Finite Storage in a Computer Network Node Environment Under General Traffic Conditions", IEEE Trans. Commun., Vol.Com-28, No. 7, pp. 992–1003, July, 1980.

Similar to the group level allocation $BG_m$, the buffer thresholds at class and sub-class levels ($BC_i$ and $TC_{ij}$) are statically chosen and tuned by network management system. Within each class, the buffer management is furthered categorized into two levels: there are queues for cells to K different output ports with $TP_i$ denoting the common threshold for all K queues; for each output port, there are queues for different VCs, if per-VC queuing is adopted, with $TV_{ik}$ denoting the common threshold for all VCs destined to output port k, k=1, 2, ..., K.

Unlike the buffer allocation at group and class levels, the queue thresholds at port and VC levels ($TP_i$ and $TV_{ik}$) are dynamically updated to the changing traffic conditions. The reasons for using dynamic thresholds for port and VC level buffer management is that the variation of traffic load tend to be substantial at these levels, and a dynamic threshold can accommodate the transient behavior of traffic load much better than a static one. In a conventional static threshold scheme the port queue threshold is set as:

$$TP_l = \frac{BC_i}{\sqrt{K}}.$$

See F. Kamoun and L. Kleinrock, "Analysis of Shared Finite Storage in a Computer Network Node Environment Under General Traffic Conditions", IEEE Trans. Commun., Vol.Com-28, No. 7, pp. 992–1003, July, 1980.

In the next section, an embodiment of the novel dynamic threshold scheme according to the present invention is described. This method provides a fair and optimal sharing of buffer memory. It should be readily apparent to a skilled artisan that although this embodiment is presented in the context of port and/or VC level queue length thresholds, the scheme can be directly applied to any problem that requires dynamic fair sharing of buffer memory.

Dynamic Queue Threshold Scheme

The embodiment described herein is an ATM switch. In the described embodiment it is assumed that the ATM switch has K output ports and a buffer of B cells, shared by the corresponding K output queues. $Q_k(t)$ is the queue length for output queue k at time t, k=1, 2, ..., K. In a preferred embodiment $Q_k(t)$ may fluctuate as the incoming traffic load for output port k and the service bandwidth allocated to output port k vary. If all the K output queues are treated equally, to ensure fair-sharing of buffer space B, each queue should be able to access at least B/K buffer memory (the fair share) when it is overloaded. On the other hand, to efficiently utilize the buffer, i.e., to achieve maximum buffer sharing, an individual overloaded queue may use any available buffer memory that are not used or demanded by other queues.

The dual goals stated above are achieved by dynamically setting a common threshold T(t) for all K queues. in this scheme, the following algorithm dynamically sets the T(t):

When a cell to output port k arrives at time t, $$T_{new}(t) = \begin{cases} \max(Q_k(t)+1, T_{old}), & \text{if } Q(t) < \alpha * B, \\ \max(T_{old}-1, T_m), & \text{if } Q(t) \geq \alpha * B, \end{cases} \quad (1)$$

where $$Q(t) = \sum_{k=1}^{K} Q_k(t),$$

representing total queue length at time t and $0 < \alpha \leq 1$. The $T_m$ represents the minimum buffer threshold statically set for each queue. By default, $T_m=0$. Therefore, the arriving cell to output port k is accepted at time t to the k-th queue if $Qk(t) < T_{new}(t)$ and $Q(t) < B$; otherwise, the cell is blocked. In either case, the value of common threshold $T_{old}$ is then updated by the value of $T_{new}(t)$.

Note that in Eq.(1), the parameter α controls the amount of memory to be shared. For a complete buffer sharing, α is set to be one and thus when queues are overloaded, 100% buffer utilization can be achieved while the memory is fairly shared among different queues. In a preferred embodiment, a small amount buffer may be set aside specifically for some operations (i.e., RM cell insertion and end-of-message cell insertion) by adjusting parameters α and $T_m$ in Eq.(1).

Multi-level Dynamic Queue Thresholds

In the previous section an embodiment was describes that used the dynamic queue threshold scheme of the present invention to manage buffer memory for different queues of output port level efficiently and fairly. The buffer memory allocation to each of K output port queues is dynamically set to be $T_{new}(t)$ by Eq.(1). However, in an ATM switch, buffer memory may need to be further divided below the port level. For example, as was mentioned earlier, an output queue may consist of many VCs. If per-VC queuing is adopted, the buffer memory needs to be logically assigned to each individual VC queue as well.

Another embodiment is described herein where each output queue k has $L_k$ VCs, k=1, 2, ..., K. The queue length for each VC of output queue k at time t is denoted by $Q_{kl}(t)$, 1=1, 2, ..., $L_k$. One widely adopted buffer management policy requires the buffer memory to be fairly shared among different output queues first (as was have done in the previous section). Then, within each output queue, the allocated memory is further fairly shared among all the VCs to this output port. This presents a multi-level buffer management problem. In this preferred embodiment the techniques of the present invention are used to develop a multi-level dynamic queue threshold scheme to meet the above criteria and in the meantime, to maximize the buffer utilization.

TP(t) is the dynamic queue threshold for each output queue and $TV_k(t)$ the dynamic queue threshold for each VC queue destined to output port k, k=1, 2, ..., K. When a cell of VC l to output port k arrives. The dynamic queue thresholds TP(t) and $TV_k(t)$ are computed in a two-step algorithm:

1. For the port queue k, $$TP(t) = \begin{cases} \max(Q_k(t)+1, TP_{old}), & \text{if } Q(t) < \alpha * B, \\ \max(TP_{old}-1, T_m), & \text{if } Q(t) \geq \alpha * B, \end{cases} \quad (2)$$

2. For the VC queue l of port k, $$TV_k(t) = \begin{cases} \max(Q_{kl}(t)+1, TV_k^{old}), & \text{if } Q_k(t) < \beta * TP(t), \\ \max(TV_k^{old}-1, T_m), & \text{if } Q_k(t) \geq \beta * TP(t), \end{cases} \quad (3)$$

where $$Q_k(t) = \sum_{l=1}^{L_k} Q_{kl}(t).$$

The parameter β serves the sane purpose as the α does and $0 < \beta \leq 1$.

The arriving cell is accepted if $Q_k(t) < TP(t)$ and $Q_{kl}(t) < TV_k(t)$ and $Q(t) < B$. Otherwise, the cell is blocked. TP(t) and $TV_k(t)$ then update the thresholds $TP_{old}$ and $TV_{old}$, respectively, whether the cell is accepted or it is discarded.

The above algorithm provides a dynamic buffer allocation scheme for buffer management at two different levels: port level and VC level. It ensures the fair and maximal sharing of buffer memory at two different levels: first at port level, then at VC level within a port. To elaborate, it is assumed that m out of K output queues are overloaded (i.e., they demand as much buffer as possible) and the rest of output queues are underloaded (i.e., they do not need any buffer for the moment). For the overloaded output queue k, there are $n_k$ overloaded VCs, $n_k \leq L_k$. $\alpha=\beta=1$ is set to provide a complete sharing of buffer memory B. Then, according to the algorithm by Eqs.(2) and (3), the buffer allocation for each of m overloaded output queues is B/m, and the buffer allocation for each of $n_k$ overloaded VCs of port k is $$\frac{B}{m*n_k}.$$

A skilled artisan will note that the above algorithm can be easily extended to deal multiple-level dynamic buffer allocation problems although only a scheme for a two-level buffer management, which is more common in practice, is presented. On the other hand, if all VCs require the same fair buffer allocation without concerning the fairness among output queues, the scheme is simplified by directly applying the algorithm described earlier to all the VCs.

Performance Comparisons and Simulation Results

In this section, the performance of the dynamic threshold scheme and other buffer management schemes are compared through several illustrative examples.

In the dynamic threshold scheme by Choudhury and Hahne in See A. K. Choudhury and E. L. Hahne, "Dynamic Queue Length Thresholds in a Shared-Memory Packet Switch", IEEE/ACM Trans. Networking, Vol. 6, No., pp. 130–140, April, 1998, there are certain amount of buffer memory θ left unallocated in steady-state as it is inherent in their scheme:

$$\theta = \frac{\alpha B}{1 + \theta \cdot S'}$$

where S is the number of overloaded queues and θ is a multiplier parameter. While the memory left unallocated would be negligible if there are many overloaded queues or the parameter θ has a very large value, the authors have shown in A. K. Choudhury and E. L. Hahne, "Dynamic Queue Length Thresholds in a Shared-Memory Packet Switch", IEEB/ACM Trans. Networking, Vol. 6, No., pp. 130–140, April, 1998, that a very large value of θ makes the dynamic control ineffective. On the other hand, with appropriate traffic policing, bandwidth allocation and other control mechanism, it is less likely that many queues, each of which goes to a different output port or line, become congested simultaneously. Therefore, the unutilized amount of memory in θ can be substantial in certain cases. For example, if α=1 for complete sharing and θ=1, a usually good choice, half of the memory would not be allocated when there is only one overload queue.

Figure 3:
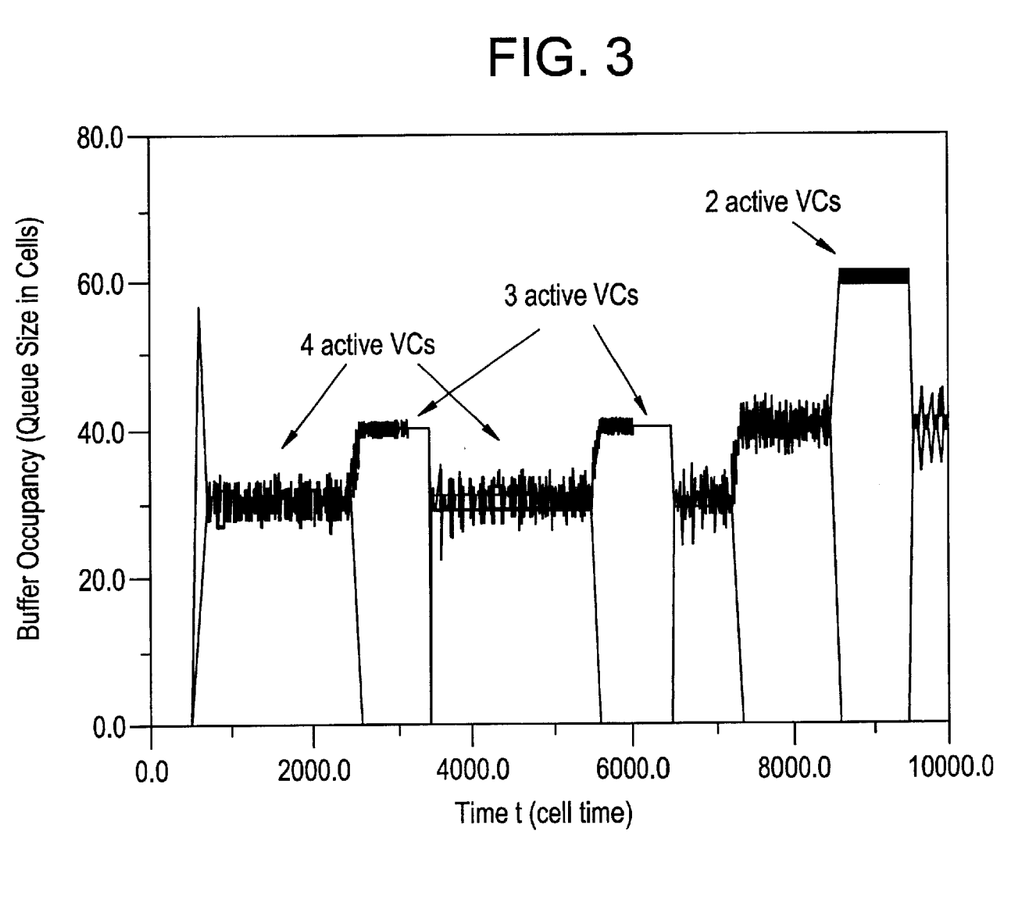
FIG. 3 shows a dynamic buffer allocation at port level with each VC destined to a different port.

In the first example, a buffer memory of 120 cells is shared by queues corresponding to four different output ports. A server of capacity 600 Mbps serves the four port queues in a round-robin fashion. A different source (or VC) feeds each port queue. The first VC is a CBR source with an arrival rate of 310 Mbps. The rest are "on/off" VBR sources with a peak rate of 310 Mbps and different "on" and "off" periods so that the overall system is stable but the overload occurs whenever there are two or more sources are actively sending cells. However, in case of only one active and overloading VC, the algorithm described in Chaudhury et al. allows that VC to take all of the available buffer memory, which are 120 cells. From FIG. 3 it can be seen that using the DT scheme of the present invention, the steady state queue occupancies for each queue are 60 cells, 40 cells and 30 cells when two, three and four VCs are active, respectively. That exactly conforms to their fair shares of buffer memory computed by the algorithm in Chaudhury et al. while the whole buffer memory of 120 cells are being used. Using the DT algorithm in Choudhury et al. the fair shares of buffer memory would be 60 cells, 40 cells, 30 cells and 24 cells, respectively. That results in unused buffer of 50%, 33%, 25% and 2%, respectively.

For static threshold scheme with the threshold being 60 cells for each port queue, the buffer is 50% under-utilized when there is only one overloading source, and the third and fourth sources cannot gain their fair shares of memory when they become active.

Figure 4:
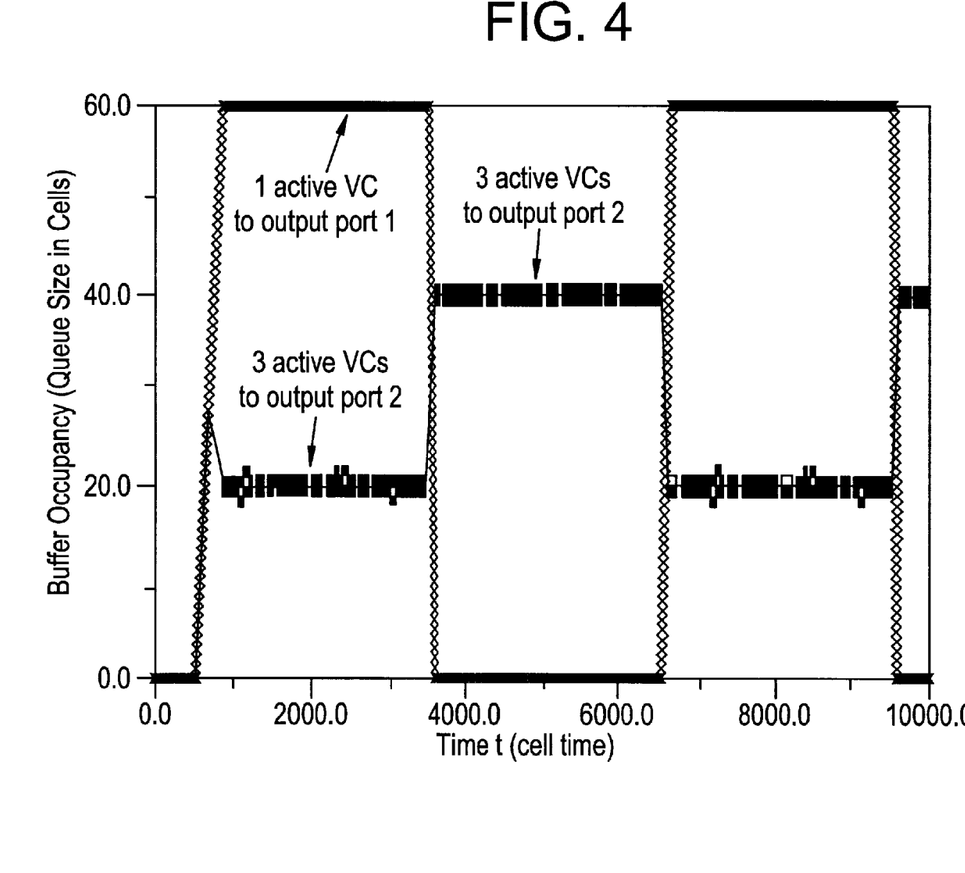
FIG. 4 shows a dynamic buffer allocation at port and VC levels.

In the second example, the same buffer memory of 120 cells shared by four VC queues destined to two different output ports. Each VC queue is fed by a different source. The first VC is destined to output port #1 and is an "on/off" VBR source with peak rate 310 Mbps. The other three statistically identical VCs are all destined to output port #2 and are CBR sources with a peak rate of 310 Mbps. Therefore, the VCs to output port #2 always create an overloading situation and need as much available buffer memory as possible. The dynamic buffer-sharing policy has two levels: the two different ports have fair shares of buffers at port levels; within the each port buffer share, different VCs have their fair shares. The dynamic queue threshold scheme of the present invention outlined by Eqs. (2) and (3) is applied. From FIG. 4, it is clear that, when the three VCs to port #2 become active at t=500 (cell time), the system is overloaded, the VC to port #1 gains its fair share of 60 cells for port-level memory allocation and the VCs to port #2 gain the other 60 cells altogether, with each of the three VCs having its fair share of 20 cells for VC-level memory allocation. When the VC to port #1 turns inactive around t=3500 (cell time), its memory allocation of 60 cells is available. Now the three active VCs to port #2 can take all 120 cells of memory at port-level, with each having its fair share of 40 cells for the VC-level. Then, when the VC to port #1 becomes active again, it re-gains its 60 cells for the port-level fair share.

Conclusion

A novel dynamic buffer management scheme for shared-memory ATM switches is disclosed. In the same spirits of the buffer management scheme proposed in Choudhury et al., the present invention has been shown to adapt to the changing queue conditions by providing fair buffer memory sharing to on-demand traffic load. The implementation is rather simple as it requests minimum processing power to compute dynamic queue thresholds. In addition, the present invention maximizes the utilization of buffer memory. By adjusting the parameter α in (1), one can control the degree of memory sharing. It is also shown how the dynamic queue threshold algorithm can be applied to develop a multi-level buffer management scheme.

With the dynamic thresholds, a hierarchical buffer memory partitioning schemes provided. The scheme logically divides and allocates buffer memory in multiple levels. It takes into account the statistical characteristics of traffic and the QoS concerns of service at group and class levels, and ensures the fair and optimal sharing of buffer memory to changing traffic conditions at port and VC levels.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. An ATM switch using a dynamic queue threshold scheme, said ATM switch comprising K output port queues and a buffer of B cells sharing said K output port queues, wherein a common threshold is dynamically set for the K output port queues, the common threshold being changed to a new value from an old value when a new cell arrives at any of said K output queues, said new value being a maximum of a length of said any of said K output queues plus one and said old value when total queue length is less than a preset value times B and, said new value being a maximum of a said old value minus one and a statically set minimum buffer threshold when total queue length is greater than or equal to a preset value times B, wherein said preset value is greater than 0, wherein K and B are integer greater than 0.

2. The system of claim 1 wherein the length of each of said K output queues fluctuates based on variations in an incoming traffic load and a service bandwidth allocated to said each of said K output queues.

3. The system of claim 1 wherein a new cell is accepted to a specific queue when a length of said specific queue is less than the new value and total queue length is less than B.

4. The system of claim 1 wherein said statically set minimum buffer threshold is equal to zero by default.

5. The system of claim 1 wherein a small amount of buffer B is allocated for some predetermined operations.

6. The system of claim 1 wherein buffer memory is allocated to VCs within said each of said K output queues, further using the dynamic queue threshold scheme.

7. The system of claim 1 wherein the dynamic queue threshold scheme is applied to multiple levels of dynamic buffers.

8. A method of dynamically setting a common threshold $T(t)$ for K queues in an ATM switch comprising said K queues, a buffer of B cells shared by said K queues, each of said K queues having a queue length of $Q_k(t)$ at time t and $k=1,2\ldots K$, with $Q_k(t)$ fluctuating with incoming traffic load and service bandwidth allocated to output port k, said method comprising:

setting a dynamic threshold $T(t)$ wherein $$T_{new}(t)=\max(Q_k(t)+1, T_{old}) \text{ when } Q(t)<\alpha^*B;$$

$$T_{new}(t)=\max(T_{old}-1, T_m) \text{ when } Q(t)>=\alpha^*B;$$

wherein $Q(t)$ is a total queue length at time t and $0<\alpha<=1$, and $T_m$ is a minimum buffer threshold statically set updating $T_{new}(t)$ and accepting a new arriving cell at output port k at time t if $Q_k(t)<T_{new}(t)$ and $Q(t)<B$, otherwise blocking said new arriving cell, wherein K and B are integer greater than 0.

9. A method of dynamically setting a common threshold $T(t)$ for K queues in an ATM switch comprising said K queues, a buffer of B cells shared by said K queues, each of said K queues having a queue length of $Q_k(t)$ at time t and $k=1,2\ldots K$, and $l=1, 2, \ldots L_k$ with $Q_k(t)$ fluctuating with incoming traffic load and service bandwidth allocated to output port k, each queue comprising $L_k$ VCs and each VC queue of port K has a queue of length $Q_{kl}(t)$ said method comprising:

setting a dynamic threshold $TP(t)$ for each output queue wherein $$TP_{new}(t)=\max(Q_k(t)+1, TP_{old}) \text{ when } Q(t)<\alpha^*B;$$

$$TP_{new}(t)=\max(TP_{old}-1, T_m) \text{ when } Q(t)>=\alpha^*B;$$

setting a dynamic threshold $TV_k(t)$ for each VC assigned to queue k wherein $$TV_k^{new}(t)=\max(Q_{kl}(t)+1, TV_k^{old}) \text{ when } Q(t)<\beta^*TP(t);$$

$$TV_k^{new}(t)=\max(TV_k^{old}-1, T_m) \text{ when } Q(t)>=\beta^*TP(t);$$

wherein $Q(t)$ is a total queue length for kth queue at time t and $0<\alpha<=1$, $0<\beta<=1$ and $T_m$ is a minimum buffer threshold statically set, updating $TP(t)$ and $TV_k(t)$ and accepting a new arriving cell at output port k at time t if $Q_k(t)<TP(t)$ and $Q_{kl}(t)<TV_k(t)$ and $Q(t)<B$, otherwise blocking said new arriving cell, wherein K, B and $L_k$ are integer greater than 0.

* * * * *

UNITED STATES PATENT AND TRADEMARK OFFICE
CERTIFICATE OF CORRECTION

PATENT NO. : 6,424,622 B1
DATED : July 23, 2002
INVENTOR(S) : Ren Qiang, Ruixue Fan, Ishii Alexander, Mark Brian and Ramamurthy Gopalakrishnan It is certified that error appears in the above-identified patent and that said Letters Patent is hereby corrected as shown below:

Column 6,
Line 57, delete "sane" and insert -- same --;
Line 61, delete "TVold" and insert -- $Tv^{old}_k$ --

Column 7,
Line 43, delete "IEEB" and insert -- IEEE --

Column 8,
Line 9, delete "2%" and insert -- 20\% --

Signed and Sealed this

Thirty-first Day of December, 2002

JAMES E. ROGAN
*Director of the United States Patent and Trademark Office*